United States Patent
Wallgren (10) Patent No.: US 8,272,176 B2
(45) Date of Patent: Sep. 25, 2012

(54) METHODS OF ASSEMBLING SOLAR ENERGY COLLECTING MODULES

(75) Inventor: Linus Eric Wallgren, Bethesda, MD (US)

(73) Assignee: SunEdison, LLC, Beltsville, MD (US)

( * ) Notice: Subject to any disclaimer, the term of this patent is extended or adjusted under 35 U.S.C. 154(b) by 123 days.

(21) Appl. No.: 12/853,838

(22) Filed: Aug. 10, 2010

(65) Prior Publication Data

US 2011/0047931 A1    Mar. 3, 2011

Related U.S. Application Data

(63) Continuation of application No. 12/367,977, filed on Feb. 9, 2009.

(60) Provisional application No. 61/049,567, filed on May 1, 2008.

(51) Int. Cl.
*E04D 13/18* (2006.01)

(52) U.S. Cl. .............. 52/173.3; 52/84; 126/623

(58) Field of Classification Search .......... 52/84, 1, 52/506.03, 506.06, 800.11, 653.1, 173.3, 52/475.1; 126/623; 136/244
See application file for complete search history.

(56) References Cited

U.S. PATENT DOCUMENTS

| | | |
|---|---|---|
| 4,226,256 A | 10/1980 | Hawley |
| 4,421,943 A | 12/1983 | Withjack |
| 4,466,424 A | 8/1984 | Lockwood, Jr. |
| 4,886,554 A | 12/1989 | Woodring et al. |
| 5,125,608 A * | 6/1992 | McMaster et al. ......... 248/163.1 |
| 5,164,019 A | 11/1992 | Sinton |
| 5,316,592 A | 5/1994 | Dinwoodie |
| 6,148,570 A | 11/2000 | Dinwoodie et al. |
| D453,727 S | 2/2002 | Shugar et al. |
| 6,414,237 B1 | 7/2002 | Boer |
| 6,443,145 B1 | 9/2002 | Buron et al. |
| D468,684 S | 1/2003 | Shugar |
| D469,057 S | 1/2003 | Shugar |
| D469,058 S | 1/2003 | Shugar |
| D471,855 S | 3/2003 | Shugar et al. |
| 6,534,703 B2 * | 3/2003 | Dinwoodie ................. 136/251 |
| 6,586,668 B2 | 7/2003 | Shugar et al. |
| 6,702,370 B2 | 3/2004 | Shugar et al. |
| 6,786,012 B2 | 9/2004 | Bradley, Jr. |
| 6,809,251 B2 | 10/2004 | Dinwoodie |
| 6,883,290 B2 | 4/2005 | Dinwoodie |
| 6,930,238 B2 | 8/2005 | Makita et al. |
| 6,968,654 B2 | 11/2005 | Moulder et al. |
| 7,155,870 B2 | 1/2007 | Almy |
| 7,172,184 B2 | 2/2007 | Pavani et al. |
| 7,178,295 B2 | 2/2007 | Dinwoodie |
| 2004/0128923 A1 | 7/2004 | Moulder et al. |
| 2004/0139689 A1 | 7/2004 | Sinha et al. |
| 2005/0144870 A1 | 7/2005 | Dinwoodie |
| 2005/0199278 A1 | 9/2005 | Aschenbrenner |

(Continued)

OTHER PUBLICATIONS

Makower et al., "Solar Opportunity Assessment Report," Presented by the Solar Catalyst Group (2003), www.solarcatalyst.com.

*Primary Examiner* — Branon Painter
(74) *Attorney, Agent, or Firm* — Armstrong Teasdale LLP (57) ABSTRACT

A solar energy collection assembly includes a wind deflector and a solar module. A method of assembling includes roll forming frame sections of channel from sheet metal, connecting the frame sections to form an upright frame, and attaching the wind deflector and solar module to the frame.

13 Claims, 6 Drawing Sheets

U.S. PATENT DOCUMENTS

| | | |
|---|---|---|
| 2005/0268959 A1 | 12/2005 | Aschenbrenner et al. |
| 2006/0053706 A1 | 3/2006 | Russell |
| 2006/0123733 A1* | 6/2006 | Moody et al. .................. 52/634 |
| 2006/0196535 A1 | 9/2006 | Swanson et al. |
| 2006/0266405 A1 | 11/2006 | Lenox |
| 2008/0087275 A1 | 4/2008 | Sade et al. |
| 2008/0236571 A1 | 10/2008 | Keshner et al. |
| 2010/0077679 A1 | 4/2010 | Sagayama |
| 2010/0186320 A1 | 7/2010 | Hoeft et al. |

* cited by examiner

METHODS OF ASSEMBLING SOLAR ENERGY COLLECTING MODULES

CROSS-REFERENCE TO RELATED APPLICATIONS

This application is a continuation of pending U.S. patent application Ser. No. 12/367,977, filed Feb. 9, 2009, which claims priority to U.S. Provisional Patent Application No. 61/049,567, filed May 1, 2008. The entire disclosure of both applications is incorporated herein by reference.

FIELD OF THE INVENTION

Embodiments of the present invention relate to a rack assembly for mounting solar energy collecting modules and an associated method for constructing a rack assembly.

DESCRIPTION OF RELATED ART

Photovoltaics (PV) is the field of technology and research related to the application of solar cells for energy by converting sunlight directly into electricity. Due to the growing demand for clean sources of energy, the manufacture of solar cells and PV arrays has expanded dramatically in recent years. These mechanisms may be may be ground-mounted or built into the roof or walls of a building. Financial incentives, such as preferential feed-in tariffs for solar-generated electricity, and net metering, have supported solar PV installations in many countries.

A variety of solar energy collecting modules currently exist. One such module is a PV panel which converts solar energy into electricity. Another module is a solar thermal collector which harnesses solar energy for heat. The modules can have different geometries, but are commonly made with a generally flat construction. PV panels are often electrically connected in multiples as solar photovoltaic arrays to convert energy from the sun into electricity. In operation, photons from sunlight knock electrons into a higher state of energy, creating electricity. Solar cells produce direct current electricity from light, which can be used for such tasks as powering equipment or recharging a battery. Cells require protection from the environment and are packaged usually behind a glass sheet. When more power is required than a single cell can deliver, cells are electrically connected together to form PV modules, or solar panels.

Multiple issues have prevented the growth of solar energy from becoming even more explosive. The most pervasive of these issues may be installation and material costs. However, due to economies of scale, solar panels become less expensive as people use and buy more and as manufacturers increase production to meet demand. Thus, the cost and price is expected to drop in the years to come.

Solar energy collecting modules are currently used in a variety of settings, including commercial, residential, and industrial environments. These modules are typically mounted on a structure secured to a support surface, such as a rooftop. Different considerations affect the design and construction of the mounting structures for the modules. These factors include ease of manufacture and installation, minimization of related costs, and resistance to environmental factors such as wind forces.

Various problems have hindered the use and development of existing mounting structures. For example, because of lift forces created by wind gusts, existing mounting structures have often generated inadequate frictional forces to maintain satisfactory contact with the underlying support surface. Despite efforts made to reduce mounting structure surface area to create a mounting structure that minimizes lift forces created by the wind, it has often been viewed as necessary to secure the mounting structures to the rooftop or other base supporting surface. This attachment process often proves to be harmful and destructive to the underlying supporting surface. For example, the installer may be required to penetrate the roof shingles, roofing paper, and sheathing. This penetration makes the roof less weather resistant and thus may result in damage to the building itself.

Additionally, materials for the mounting structures are often expensive and manufacturing and installation have been complicated, thus adding to the expense of the mounting structure. An increase to the cost of the system negatively impacts the financial advantage that consumers expect from a solar energy solution.

Generally, solving any one of the aforementioned problems has magnified the other existing problems and no suitable solution has been found for a secure mounting structure having a reasonable cost.

Accordingly, a practical solution is needed that provides a secure mounting rack assembly with a novel construction for mounting solar energy collecting modules. Additionally, a solution is needed for providing an efficient and inexpensive method of constructing the novel rack assemblies.

SUMMARY OF THE EMBODIMENTS

In a first aspect, an embodiment comprises a rack assembly for supporting a solar energy collecting module on a support surface. The rack assembly comprises a plurality of upright frames and a transverse element connected to the plurality of frames. Each frame comprises a first base leg extending substantially parallel to the support surface in a first direction and a second leg extending from the first leg at an angle relative to the first leg. The second leg supports the solar energy collecting module at an angle relative to the support surface. A transverse member is connected to the first leg of each of the plurality of frames and extends substantially parallel to the support surface in a second direction substantially perpendicular to the first direction. The plurality of upright frames is constructed by roll forming at least one leg of the upright frame from sheet metal.

In a further aspect, an embodiment comprises a rack assembly for supporting a solar energy collecting module on a support surface. The rack assembly comprises a plurality of upright triangular frames. Each triangular frame comprises a first leg extending substantially parallel to the support surface in a first direction and a second leg extending from the first leg at a first angle relative to the first leg. The second leg supports the solar energy collecting module at an angle relative to the support surface. Each frame additionally includes a third leg extending from the first leg at a second angle relative to the first leg, the third leg supporting a wind deflector plate at an angle relative to the support surface, the third leg connected with the second leg to form the triangular frame. Each frame further includes a transverse member connected to the first leg of each of the plurality of frames and extending substantially parallel to the support surface in a second direction.

In another aspect, an embodiment comprises a method for constructing a rack assembly for supporting a solar energy collecting module on a support surface. The method comprises roll forming a first and second section of channel from sheet metal. The first and second sections of channel are connected to form an upright frame. A transverse element is attached to the upright frame. The upright frame comprises a first leg formed from the first section of channel and extending substantially parallel to the support surface. The upright frame also comprises a second leg formed from the second section of channel and extending from the first leg at an angle relative to the first leg.

In an additional aspect, an embodiment comprises a method for on-site construction of a rack assembly for supporting a solar energy collecting module on a support surface. The method comprises providing a roll forming machine and a coil of sheet metal adjacent an installation location, using the roll forming machine to form a plurality of channels from the coil of sheet metal, and constructing an upright frame from the channels. The frame comprises a horizontally extending leg, a first upwardly angled leg, and a second upwardly angled leg. A transverse element is connected to a plurality of upright frames.

Other objects, features, and characteristics of the present embodiments will become apparent upon consideration of the following description and the appended claims.

BRIEF DESCRIPTION OF THE FIGURES

In the drawings, like reference characters generally refer to the same parts throughout the different views. In the following description, various embodiments of the present invention are described with reference to the following drawings, in which.

DETAILED DESCRIPTION

Figure 1:
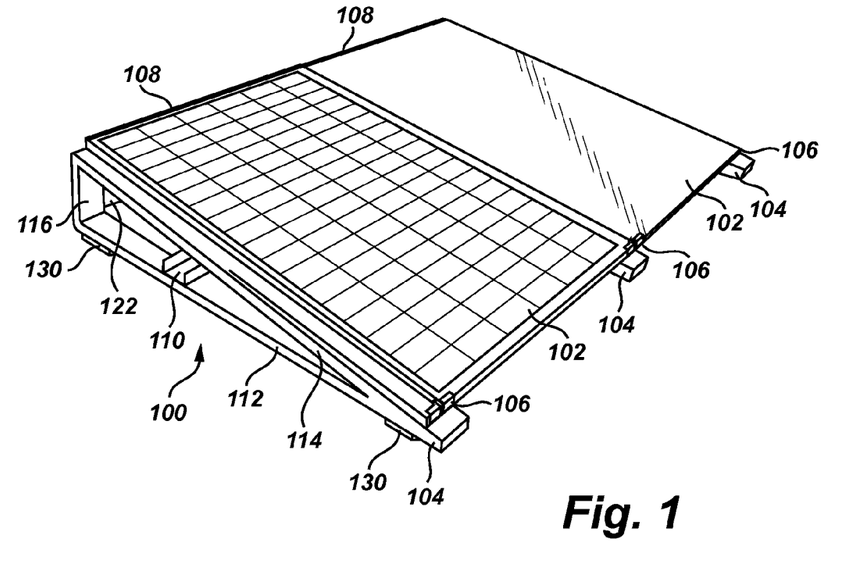
FIG. 1 is a front perspective view of a rack assembly according to a first embodiment.

FIG. 1 illustrates a first embodiment of a rack assembly 100. The rack assembly 100 may include a plurality of frames 104. Each frame 104 may include a base leg 112 and one or more additional legs 114 and 116. The rack assembly may additionally include clips 106 and panels 122 having flanges 108. A transverse member 110 may extend the length of the rack assembly 100 and friction pads 130 may be affixed to the base of the rack assembly 100.

In the illustrated embodiment, two solar energy collecting modules 102 are mounted on three frames 104. The solar energy collecting modules 102 are of the kind that is generally flat, such as photovoltaic modules. The solar energy collecting modules 102 are mounted on the rack assembly 100 at a predetermined angle and are secured by clips 106 and flange portions 108 of panels 122. The transverse member 110 extends the length of the rack assembly 100 and is secured to the frames 104 on the base leg 112 of each of the frames 104. The transverse member 110 may serve as a ballast tray for adding additional weight to the rack assembly 100.

The rack assembly 100 may be mounted on relatively leveled and mildly sloping surfaces, such as for example on the roof of a building. The friction pads 130 affixed to the bottom of the frames 104 may provide additional support for retaining the rack assembly 100 on a support surface. The friction pads 130 may be made of rubber and may be affixed in a variety of configurations using one of a variety of techniques. In the illustrated embodiment, one friction pad 130 is juxtaposed adjacent each end of the base leg 112 of the frame 104. However, it should be understand that one friction pad 130 or a larger number of friction pads 130 may be affixed in alternative configurations.

Figure 2:
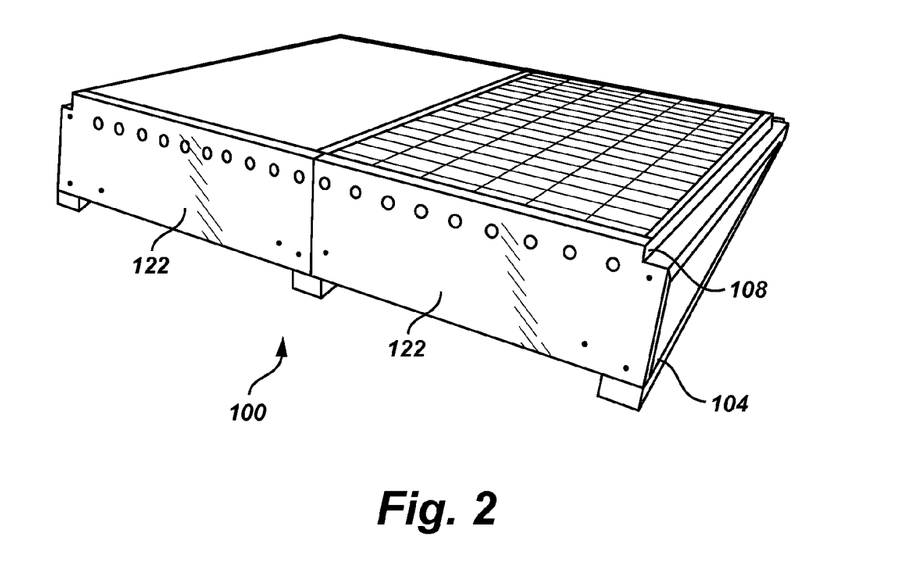
FIG. 2 is a rear perspective view of a rack assembly according to the first embodiment.

FIG. 2 illustrates the rack assembly 100 as shown in FIG. 1 from a rear perspective view. As can be seen more clearly, two panels 122 extend the width of the rack assembly 100. The panels 122 are dimensioned to serve as wind deflectors to eliminate uplift forces. Each panel 122 spans the distance between two frames 104, which corresponds approximately to the width of each solar energy collecting module 102.

Longer panels that span the full width of the rack assembly 100 may also be used. The panels 122 may be secured to the frames 104 using any appropriate fastening method, such as adhesive, screws, bolts, or pop rivets. As set forth above, with respect to FIG. 1, the panels 122 include flange portion 108 which serves to retain the top edges of each solar energy collecting module 102.

Figure 3:
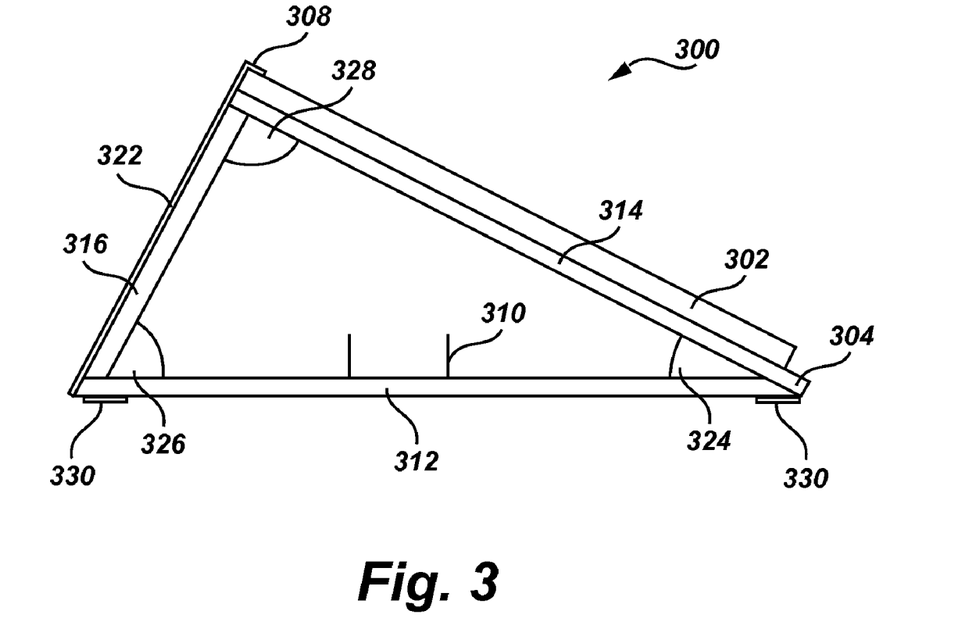
FIG. 3 is a side view of a rack assembly in accordance with an additional embodiment of the invention.

FIG. 3 is a side view of a rack assembly 300. The frame 304 shown in this embodiment has a triangular shape. The frame 304 includes a base leg 312 and two angled legs 314, 316. Each leg 312, 314, 316 is preferably comprised of U-shaped channel pieces. The U-shaped channel pieces may be easily manufactured from roll-formed sheet metal, as will be described in more detail below. The legs 312, 314, and 316 may be juxtaposed at pre-selected angles 324, 326, and 328.

Other frame geometries may also be used. Frames may have less than three legs or more than three legs. Frames may have closed geometries, such as a triangle or square, or open geometries, such as an open angle formed by two legs.

Using a triangle frame embodiment as illustrated in FIG. 3, the base leg 312 rests on a support surface. One or more frictional pads 330 may be affixed to a portion of the base leg 312 that contacts the support surface. In the embodiment of FIG. 3, the first angled leg 314 supports the solar energy collecting module 302, and the second angled leg 316 supports a panel 322.

The incline angle 324 of first angled leg 314 may be predetermined in order to maximize the interception of solar energy. Similarly, the incline angle 328 between the first 314 and second 316 angled legs may be predetermined to utilize the wind deflecting properties of the panels 322 and to control the amount of uplift generated by wind passing over the rack assembly 300. The incline angles 324, 326, and 328 of the first angled leg 314 and the second angled leg 316 may be adjusted by varying the lengths of the first and second angled legs 314, 316. Additionally, one or more transverse members 310 may be connected to the base leg 312 of the frame 304. The transverse member 310 may be used as a ballast tray.

Figure 4:
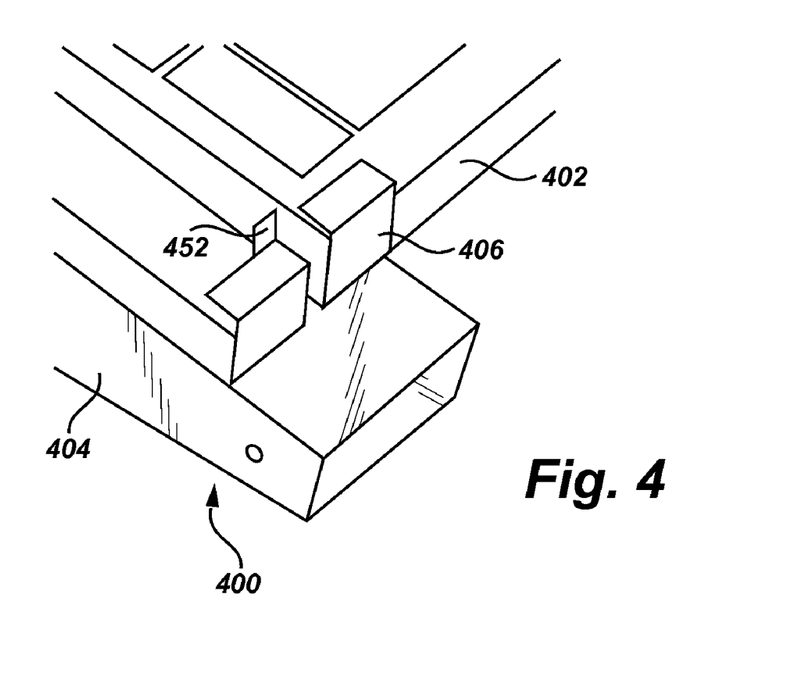
FIG. 4 is a perspective view of a clip for use with multiple embodiments of the invention.

FIG. 4 illustrates a clip 406 used to secure the bottom edge of solar energy collecting modules 402. The height of the clip 406 may be selected to approximately equal the height of the solar energy collecting module 402 such that the solar energy collecting module 402 can be firmly and securely inserted into the clip 406. The clip 406 may be manufactured separately from the frame 404 of the rack assembly 400 and secured onto the frame 404 using fasteners such as screws, bolts, or pop rivets. The clip 406 may alternatively be made by punching out and bending a piece of the frame 404. A tab 452 maybe used to separate and longitudinally align adjacent solar energy collecting modules 402.

Figure 5:
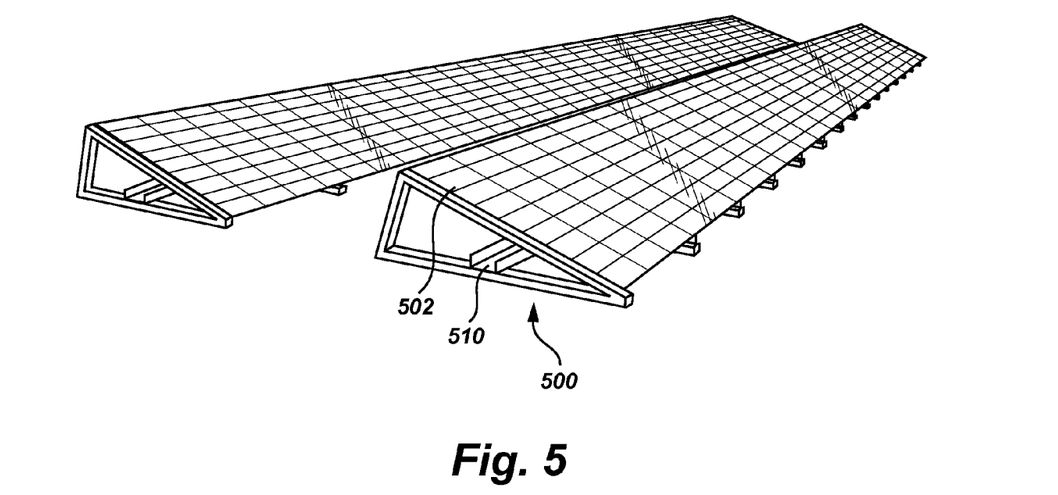
FIG. 5 is a perspective view of a rack assembly according to a further embodiment of the invention.

FIG. 5 illustrates an additional embodiment of a rack assembly 500 in which seventeen frames 504 support sixteen solar energy collecting modules 502. The embodiments shown in FIGS. 1-5 are exemplary only and rack assemblies with different numbers of frames may be constructed to hold different numbers of solar energy collecting modules depending on need. Longer rack assemblies may require multiple pieces of transverse member 510 in order to connect all the frames.

Figure 6:
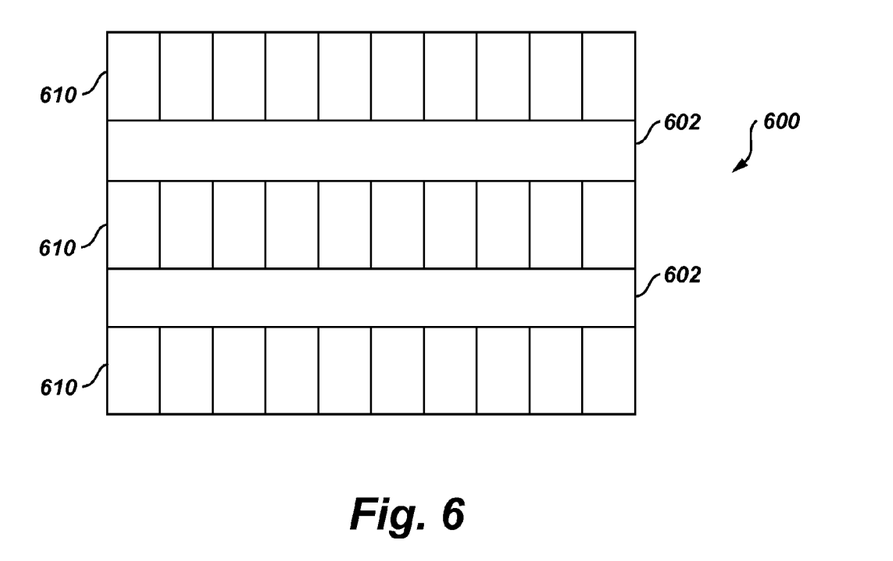
FIG. 6 is a top plan schematic view of a rack assembly array in accordance with an additional embodiment of the invention.

FIG. 6 is a top plan schematic view of a rack assembly array 600. As shown in FIG. 6, rack assemblies 610 are combined to form a rack assembly array 600. Although shown with three rack assemblies 610, a rack assembly array may include more or fewer rack assemblies. Additionally, the rack assemblies do not need to be of the same size. Rows of rack assemblies 610 may be connected to adjacent rows with sections of galvanized steel strut 602. The steel strut 602 ties the sections of rack assemblies 610 together to spread force loads and may additionally be used as mounting points to which electrical conduit runs can be affixed.

Figure 7:
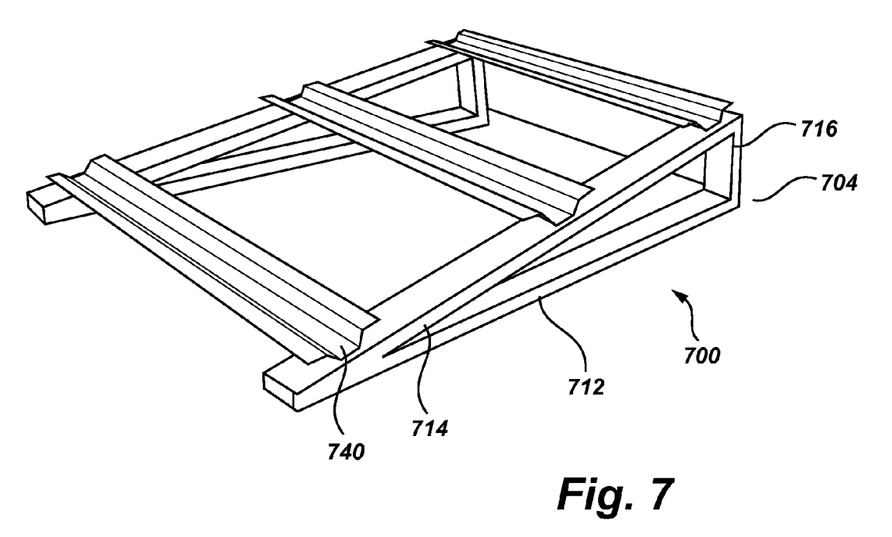
FIG. 7 is a perspective view illustrating an alternative rack assembly embodiment.

FIG. 7 is a perspective view illustrating an alternative rack assembly embodiment. A rack assembly 700 includes a frame 704 for use with a solar energy collecting module in the form of an unframed PV laminate. The frame 704 may have a triangular configuration including a base member 712 connected with angled members 714 and 716. One or more stiffening ribs 740 may be provided and may be connected to angled members 714 of multiple frames 704. the connection may be facilitated through the use of pop-rivets or other fasteners. The rack assembly 700 may also include one or more transverse members (1110, FIG. 11), which may serve as ballast trays.

In order to mount PV laminates, an adhesive or other fastening means may be applied to affix the PV laminates to the stiffening ribs 740. In addition to supporting the PV laminates, the stiffening ribs 740 may function as a bonded grounding path for the assembly 700.

Similarly to the embodiments described above with respect to FIGS. 1-5, the rack assembly 700 may be constructed from galvanized sheet metal members assembled with pop-rivets or other fasteners.

Figure 8:
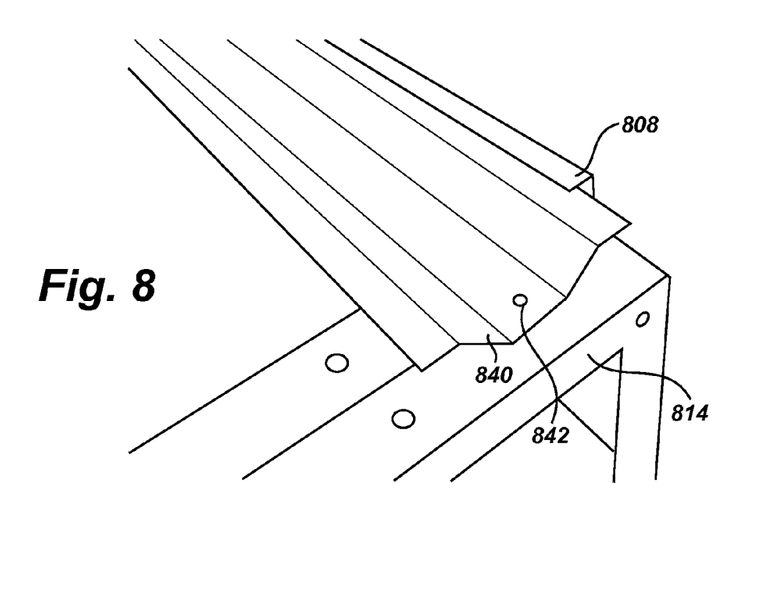
FIG. 8 is a perspective view illustrating a pop-rivet attachment of a stiffening rib to a frame in accordance with the alternative embodiment of the invention.

FIG. 8 is a perspective view illustrating a pop-rivet attachment 842 of a stiffening rib 840 to a frame 804 in accordance with the alternative embodiment of FIG. 7. More specifically, the stiffening rib 840 is attached by the pop-rivet attachment 842 to angled arm 814 of the frame 804. In the illustrated embodiment, a flange 808 may provide additional stability.

Figure 9:
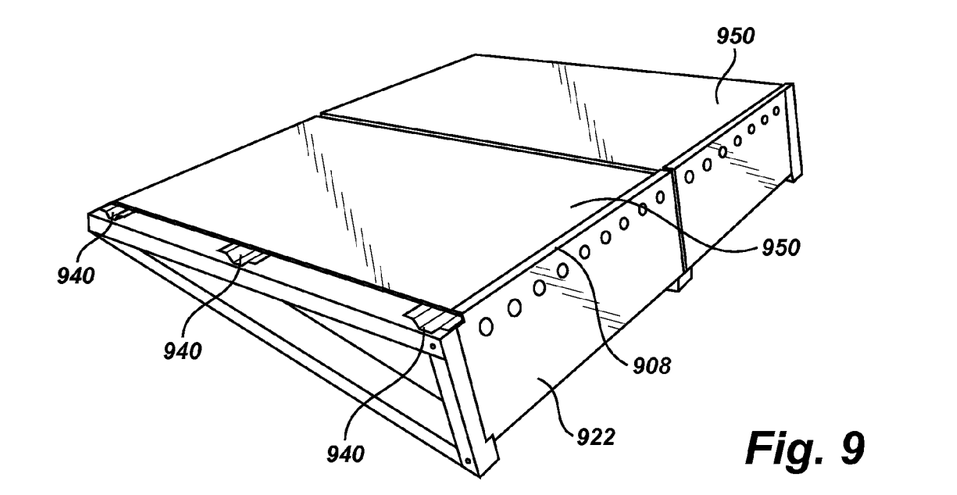
FIG. 9 is a perspective view illustrating laminates attached to the stiffening ribs in accordance with the alternative embodiment of the invention.

FIG. 9 is a perspective view illustrating PV laminates 950 attached to a plurality of stiffening ribs 940 in accordance with an embodiment of the invention. Such attachment is preferably accomplished through the use of an adhesive, but may alternatively be accomplished through other fastening mechanisms. Flange portions 908 of panels 922 may operate to encase edges of the PV laminates 950. In the illustrated embodiment, two PV laminates 950 are mounted on three stiffening ribs 940. However, it should be understood that in alternative embodiments, any suitable number of stiffening ribs 940 may be implemented for attachment to the PV laminates 950.

Figure 10:
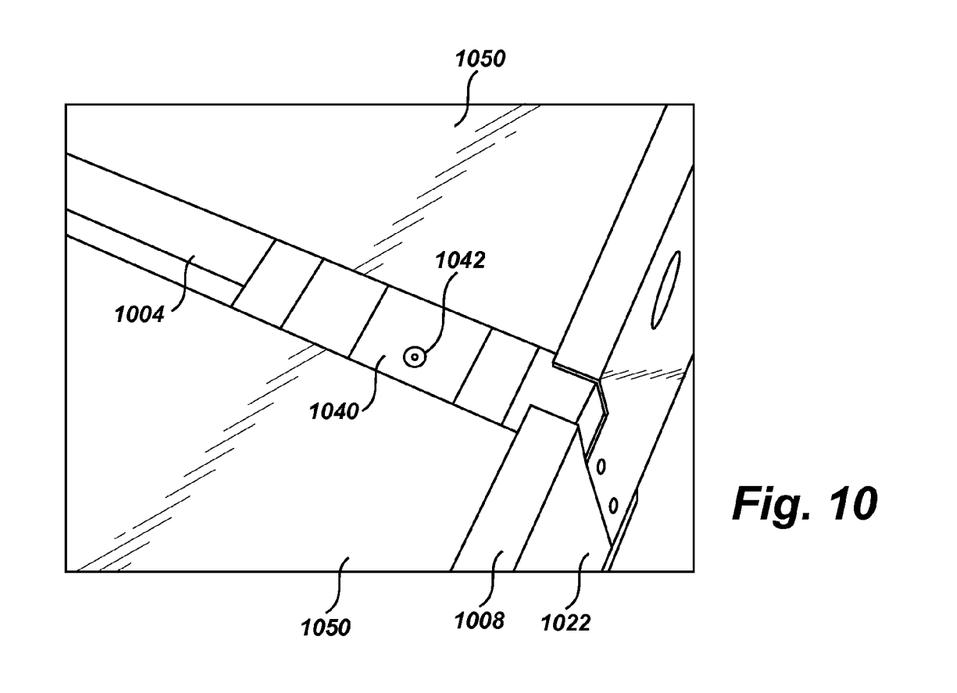
FIG. 10 is a perspective view illustrating a junction between the laminate, the stiffening rib, and the rack assembly in accordance with the alternative embodiment of the invention.

FIG. 10 is a perspective view illustrating a junction between PV laminates 1050, a stiffening rib 1040, and a rack assembly 1004 in accordance with the embodiment of the invention illustrated in FIGS. 7-9. FIG. 10 additionally illustrates a pop-rivet connector 1042 securing the stiffening rib 1040 to the rack assembly 1004. Additionally, panels 1022 may include flanges 1008 that cover an edge of the stiffening rib 1040 and further encase an edge of the PV laminates 1050.

Figure 11:
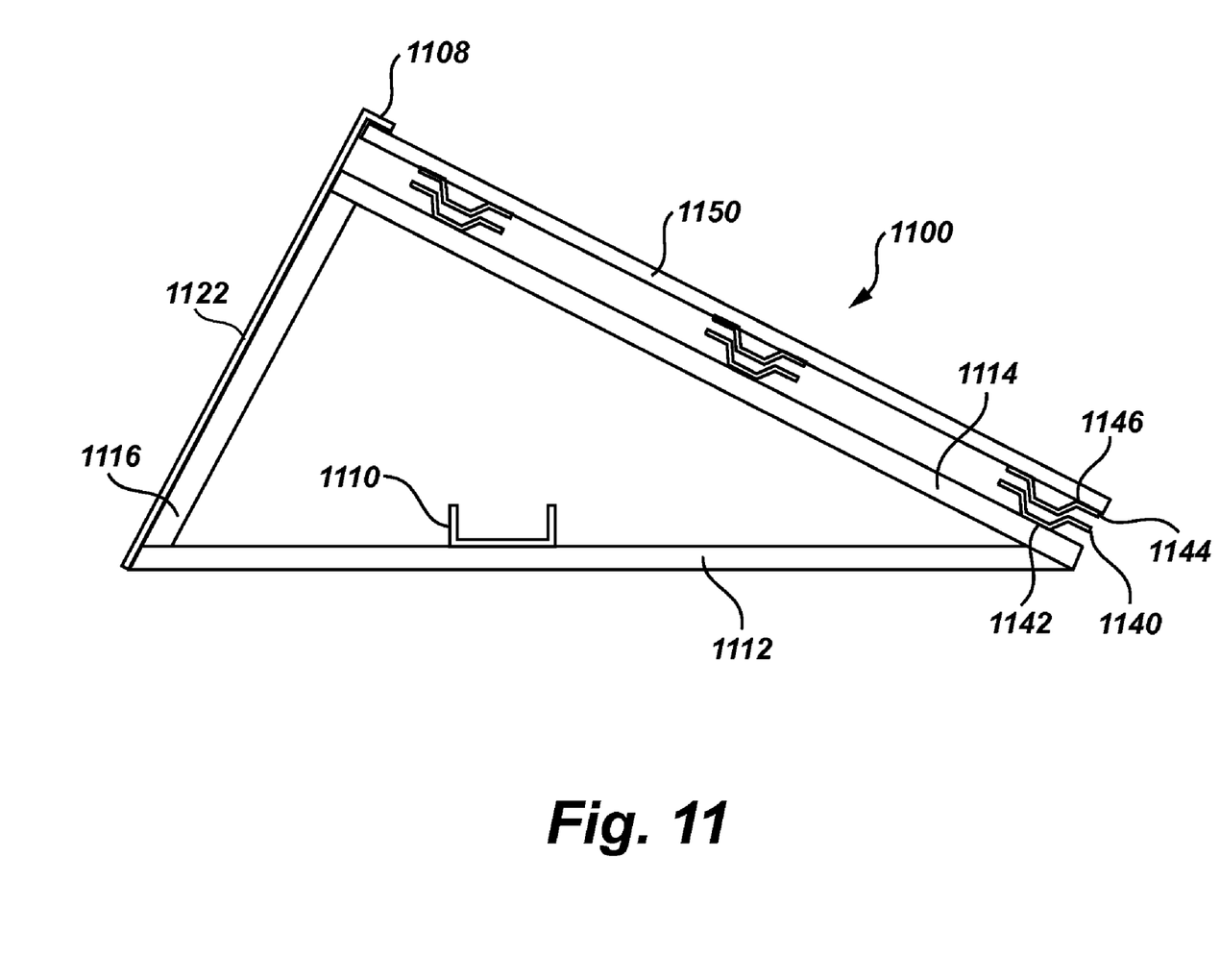
FIG. 11 is a side view illustrating an additional embodiment of the invention.

FIG. 11 is a side view illustrating an additional embodiment of the invention. In this embodiment, one or more transverse ribs 1140 are attached to angled arm 1114 by pop-rivet attachment 1142. One or more stiffening ribs 1144 are separately attached to a PV laminate 1150, preferably using adhesive 1146. The shapes of the transverse ribs 1140 and stiffening ribs 1144 are complementary, such that the PV laminate 1150 may be attached to the rack assembly 1100 by inserting the stiffening ribs 1144 into the transverse ribs 1140. The two complementary ribs may be secured together using locking tabs, adhesive, fasteners, such as pop-rivets or screws, or other appropriate means. In this manner, the rack assembly 1100 may be assembled at the job site, and the stiffening ribs 1144 may be adhered to the PV laminate 1150 at another location in a controlled environment in order to minimize temperature or moisture concerns. The assembly of PV laminate 1150 and stiffening ribs 1144 may then be transported to the job site and snapped onto the transverse ribs 1140 previously mounted to the rack assembly 1100.

The rack assembly according to the described embodiments has a relatively simple construction, which may be easily manufactured. Referring to FIG. 1, the frames 104 of rack assembly 100 may be constructed using channel pieces fabricated from a roll forming process. Roll forming is a continuous bending operation in which a long strip of is passed through consecutive sets of rolls, or stands, each performing only an incremental part of a bend, until a desired cross-sectional profile is obtained. A variety of cross-sectional profiles can be produced using varied roll tools. Roll formed sections are generally lighter and stronger than extrusions of a similar shapes, as they have been work hardened in a cold state. Other advantages of roll forming include the fact that that roll formed parts can be made having a finish or already painted. Furthermore, in comparison to extrusion processes, labor for roll forming is greatly reduced.

Roll forming lines can be set up with multiple configurations to punch and cut off parts in a continuous operation. For cutting a part to length, the lines can be set up to use a pre-cut die where a single blank runs through the roll mill, or a post-cut die where the profile is cutoff after the roll forming process. Features may be added in a hole, notch, embossment, or shear form by punching in a roll forming line. These part features can be done in a pre-punch application before roll forming starts, in a mid-line punching application during roll forming, or a post punching application after roll forming is completed. Some roll forming lines incorporate only one of the above punch or cutoff applications, others incorporate some or all of the applications in one line.

A roll forming process for forming the channel pieces used in the frames of disclosed embodiments may include feeding sheet metal from a coil through a plurality of roll pass combinations in a roll pass machine. The sheet metal may be galvanized steel, Galvalume™ or any other appropriate sheet metal. In accordance with the embodiments displayed in FIGS. 1-10, the resulting channel pieces may have a substantially V-shape with a flat bottom wall and a pair of opposed upstanding side walls. The roll pass machine may include flying punches to form cut-outs and sheering devices to cut the channel into pieces of predetermine lengths. Once formed, the channel pieces are connected together using fasteners to form frames. Three channel pieces of different lengths may be fastened together into a triangular shape having a base leg and two angled legs.

Another manufacturing embodiment includes forming each of the frames from a single channel piece. Instead of roll forming each leg as a separate piece of channel, the roll pass machine may be used to form a single channel long enough to form a full frame. Notches may be formed in the sidewalls of the channel to facilitate bending the single channel piece into the frame shape. The roll pass machine may use one or more flying punches to cut the notches during the roll forming process, or, as set forth above, the notches may be cut independently before or after the channel is formed. The notched piece of channel can then be folded into a frame and fastened together using fasteners.

Following the formation of frames, a transverse member (such as member 110 shown in FIG. 1) is fastened to a predetermined number of frames to form a rack assembly. A single transverse member may be used to span the full width of the rack assembly or multiple transverse members may be used to span the full width. The transverse element may also be formed using a roll forming process.

Referring to FIG. 4, clip 406 may be formed from cut or stamped sheet metal patterns. A first bend is used to form the top of the clip and a second bend is used to form the bottom of the clip that is fastened to the frame. A clip may also be made during the roll forming process of the channels. A flying punch may form a cutout portion in a channel which may then be bent to form the clip.

Referring to FIGS. 1 and 2, panel 122 may be formed from cut or stamped sheet metal patterns. A first bend may be used to form the flange portion 108. The panel may be secured to the rack assembly 104 after the solar energy collecting module 102 is placed on the assembly and into the clips 106 so that the flange portion 108 retains the top edge of the solar energy collecting module 102.

Furthermore, with respect to the embodiment of FIGS. 7-11, PV laminates 750 are attached to the stiffening ribs 740 by means of an adhesive. Adhesion of the sheet metal stiffening ribs 740 to the backside of the laminate 740 is preferably accomplished in a controlled environment in order to minimize temperature or moisture concerns. Attachment of the stiffening ribs 740 to the triangular base structures 704 is preferably accomplished by implementing a pneumatic pop-rivet gun. This can be accomplished at the job site.

The ease of manufacture allows for construction of a rack assembly on-site at an installation location. A portable roll forming machine may be brought to an installation location where the channels for the frame and transverse members may be fabricated. The channels may then be fastened together to form the frames and the transverse member fastened to the frames to form a rack array. For a rooftop installation, the channels and transverse member may be formed on the ground and then lifted up to the roof where the frames and rack array are formed. A conveyor belt may be used to lift the rack array elements to the roof.

Having described certain embodiments of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

What is claimed:

1. A method of assembling a solar energy collection assembly including a wind deflector and a solar module, the method comprising:
    roll forming first, second and third legs from sheet metal;
    connecting the first, second and third legs to form a triangular-shaped upright frame, the first leg configured to extend substantially parallel to a support surface, the second leg extending from the first leg at a first angle and configured to support the module, the third leg extending from the first leg at a second angle and connected to the second leg;
    connecting a first rib directly to the second leg, the first rib perpendicular to the second leg;
    connecting a second rib to the solar module;
    attaching the solar module to the frame by securing the first and second ribs to one another; and
    attaching the wind deflector to the third leg at the second angle, the deflector extending substantially the entire vertical length of the third leg.

2. The method of claim 1 wherein securing the first and second ribs includes inserting the second rib into the first rib.

3. The method of claim 2 wherein securing the first and second ribs includes using locking tabs, adhesive, rivets or screws.

4. The method of claim 1 wherein connecting the second rib to the solar module includes adhering the second rib to the module using adhesive.

5. The method of claim 1 wherein connecting the first rib to the frame includes riveting the first rib to the second leg.

6. The method of claim 1 further comprising roll-forming a transverse member and attaching the transverse member to the first leg.

7. The method of claim 6 further comprising connecting a plurality of triangular shaped frames.

8. The method of claim 7 further comprising connecting the triangular shaped frames to the transverse member.

9. The method of claim 8 wherein the method includes riveting the transverse member to two adjacent triangular shaped frames.

10. The method of claim 1 further comprising installing the assembly on-site at an installation location.

11. The method of claim 10 wherein the step of roll forming is performed on-site at the installation location.

12. The method of claim 1 wherein the first rib is generally U-shaped and includes a pair of outwardly extending arms configured to provide a surface to support the solar module.

13. The method of claim 1 wherein the wind deflector includes a flange that extends over the first rib.

* * * * *